(12) United States Patent
Ono et al.

(10) Patent No.: US 12,340,009 B2
(45) Date of Patent: Jun. 24, 2025

(54) INFORMATION INPUT DEVICE

(71) Applicant: Nippon Telegraph and Telephone Corporation, Tokyo (JP)

(72) Inventors: Kazuyoshi Ono, Tokyo (JP); Shin Toyota, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 18/002,560

(22) PCT Filed: Jun. 24, 2020

(86) PCT No.: PCT/JP2020/024780
§ 371 (c)(1),
(2) Date: Dec. 20, 2022

(87) PCT Pub. No.: WO2021/260830
PCT Pub. Date: Dec. 30, 2021

(65) Prior Publication Data
US 2023/0244298 A1    Aug. 3, 2023

(51) Int. Cl.
*G06F 3/01* (2006.01)
*G02C 11/00* (2006.01)

(52) U.S. Cl.
CPC .............. *G06F 3/011* (2013.01); *G02C 11/00* (2013.01)

(58) Field of Classification Search
CPC . G06F 3/011; G06F 3/012; G06F 3/01; G06F 3/015; G06F 3/017; G02C 11/00; G02C 11/10
See application file for complete search history.

(56) References Cited

U.S. PATENT DOCUMENTS 11,846,782 B1*  12/2023  Patton ................ G02B 27/0176
2012/0029336 A1*  2/2012  Terada .................... A61B 5/374
                                                              600/383
(Continued)

FOREIGN PATENT DOCUMENTS

| CN | 110198665 A | 9/2019 |
| KR | 102125055 B1 * | 6/2020 |

OTHER PUBLICATIONS

Machine Translation of KR102125055B1 (Year: 2020).*
(Continued)

*Primary Examiner* — Patrick N Edouard
*Assistant Examiner* — Joseph P Fox
(74) *Attorney, Agent, or Firm* — Slater Matsil, LLP

(57) ABSTRACT

A first determination unit determines that a movement of a face of a wearer has occurred, when a distortion detection unit detects distortion of the spectacle frame. The second determination unit determines whether a movement of a jaw of the wearer has occurred, based on an electric signal measured by a first temple tip electrode and a second temple tip electrode with a common electrode as a ground potential. An output unit outputs a command due to operation of the spectacle frame by the wearer when the first determination unit determines that the movement of the face of the wearer has occurred and at the same time the second determination unit determines that the movement of the jaw of the wearer has occurred.

10 Claims, 2 Drawing Sheets

(56) References Cited

U.S. PATENT DOCUMENTS

| | | | |
|---|---|---|---|
| 2012/0147317 A1* | 6/2012 | Loeb, Jr. | G02C 7/06 |
| | | | 351/159.43 |
| 2012/0229248 A1 | 9/2012 | Parshionikar et al. | |
| 2016/0036965 A1* | 2/2016 | Kim | H04M 1/67 |
| | | | 455/411 |
| 2019/0369726 A1 | 12/2019 | Kang et al. | |
| 2020/0288247 A1* | 9/2020 | Reily | H04R 29/001 |

OTHER PUBLICATIONS

BIOPAC Systems, Inc., "Active Electrode: TSD150 Series Products: BIOPAC Systems", [Searched on May 22, 2020], (http://biopac-sys.jp/products/tsd150a/), 4 pages.

Ichikawa et al. "Development of Interface System using Electromyograms of Face Movements" 10th Forum on Information Technology, vol. 2, G-018, 2011, pp. 559-560.

Konno et al., "Method for Multi-dimensional Operation Interface Using Eye Location Detection", Journal of the Institute of Image Information and Television Engineers, vol. 61, No. 4, 2007, pp. 518-525.

Sagarifuji, "What is the Future of Eye Controlled Communication Devices for Individuals with Special Needs", CREACT Corp., Chapter 2, Special Feature B: Disability Aid and Visuals, Journal of the Institute of Image Information and Television Engineers, 2015, vol. 69, No. 6, pp. 530-534.

Yamashita et al., "Propagation of the High Frequency Component Caused by the Impact on the Tooth," J Jpn Prosthodont Soc, vol. 43, 1999, pp. 489-494.

\* cited by examiner

INFORMATION INPUT DEVICE

CROSS-REFERENCE TO RELATED APPLICATIONS

This application is a national phase entry of PCT Application No. PCT/JP2020/024780, filed on Jun. 24, 2020, which application is hereby incorporated herein by reference.

TECHNICAL FIELD

The present invention relates to an information input device configured to input information.

BACKGROUND

Eye gaze interfaces have been put to practical use as devices configured for individuals with severe congenital limb defects to input information into information processing devices such as a computer (NPL 1). Functions of pointing devices included in user interfaces ordinarily used by healthy people, such as a mouse, are required to access information usually used by healthy people. That is, to access information, operation of moving a pointer and a movement comparable to a click (click, press, drag, or drop) are required to be included as functions that operate a pointer or an icon displayed on a screen of a computer (NPL 2).

CITATION LIST

Non Patent Literature

NPL 1: Naoko Sagarifuji, "What is the Future of Eye Controlled Communication Devices for Individuals with Special Needs", Chapter 2, Special Feature B: Disability Aid and Visuals, Journal of the Institute of Image Information and Television Engineers, Vol. 69, No. 6, pp. 530-534, 2015.

NPL 2: Hidetoshi Konno, et al., "Method for Multi-dimensional Operation Interface Using Eye Location Detection", Journal of the Institute of Image Information and Television Engineers, Vol. 61, No. 4, pp. 518-525, 2007.

SUMMARY

Technical Problem

In known techniques, for example, an eye-tracker is used to achieve operation of moving a pointer by an eye gaze and a movement comparable to a click by blinking. However, in known techniques, a malfunction may occur in the pointing function due to an involuntary movement that is different from the user's intent. For example, when a user blinks despite the intention of the user, the device recognizes it as a movement comparable to a click. For this reason, the user needs to use the device with caution to avoid the involuntary movement. In known techniques, the user falls into a situation in such a manner that the user is forced to limit blinks that is against the user's intention during use of the device, and a burden of the user such as fatigue has been large.

Embodiments of the present invention are contrived to solve the above-described problem, and an object thereof is to enable information to be input in a natural form for the user with the burden of the user being reduced.

Means to Solve Problems

An information input device according to an aspect of embodiments of the present invention includes a spectacle frame, a distortion detection unit provided in the spectacle frame and configured to detect distortion of the spectacle frame, a measurement electrode provided in a temple tip of the spectacle frame and configured to measure an electric signal caused by a movement of a jaw of a wearer, a first determination unit configured to determine that a movement of a face of the wearer has occurred when the distortion detection unit detects the distortion of the spectacle frame, a second determination unit configured to determine whether the movement of the jaw of the wearer has occurred, based on the electric signal measured by the measurement electrode, and an output unit configured to output a command due to operation of the spectacle frame by the wearer when the first determination unit determines that the movement of the face of the wearer has occurred and at the same time the second determination unit determines that the movement of the jaw of the wearer has occurred.

An information input device according to an aspect of embodiments of the present invention includes a spectacle frame, a distortion detection unit provided in the spectacle frame and configured to detect distortion of the spectacle frame, an acceleration sensor provided in the spectacle frame and configured to measure vibration occurred on the spectacle frame, a first determination unit configured to determine that a movement of a face of a wearer has occurred when the distortion detection unit detects the distortion of the spectacle frame, a third determination unit configured to determine whether a movement of a jaw of the wearer has occurred, based on the vibration measured by the acceleration sensor, and an output unit configured to output a command due to operation of the spectacle frame by the wearer when the first determination unit determines that the movement of the face of the wearer has occurred and at the same time the third determination unit determines that the movement of the jaw of the wearer has occurred.

Effects of Embodiments of the Invention

As described above, in accordance with aspects of embodiments of the present invention, the first determination unit determines whether the movement of the face of the wearer has occurred and the second determination unit determines whether the movement of the jaw of the wearer of the spectacle frame has occurred, and thus it is possible to input information in a natural form for the user with the burden of the user being reduced.

DETAILED DESCRIPTION OF ILLUSTRATIVE EMBODIMENTS

Hereinafter, an information input device according to embodiments of the present invention will be described.

First Embodiment

Figure 1:
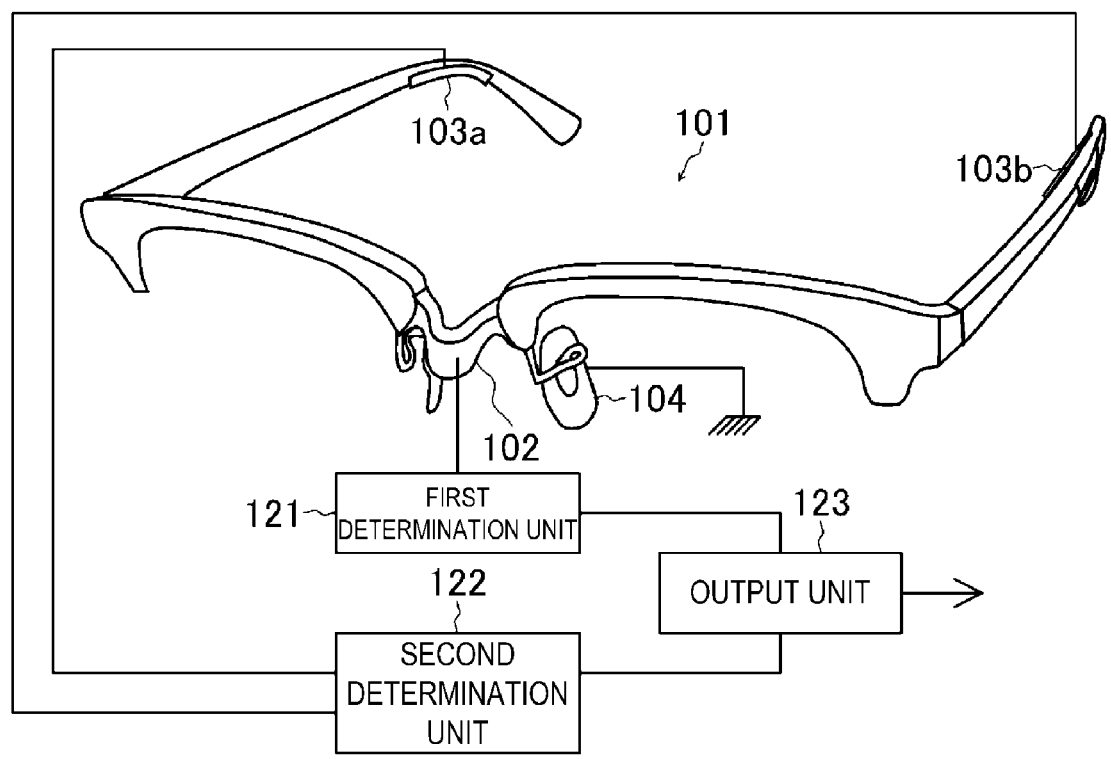
FIG. 1 is a configuration diagram illustrating a configuration of an information input device according to a first embodiment of the present invention.

First, an information input device according to a first embodiment of the present invention will be described with reference to FIG. 1. The information input device includes a spectacle frame 101, a distortion detection unit 102, a first temple tip electrode 103a, a second temple tip electrode 123, a first determination unit 121, a second determination unit 122, and an output unit 123. The information input device also includes a common electrode 104 provided in a nose pad of the spectacle frame 101 and contacts skin of a wearer of the spectacle frame 101 at a part of the nose pad. The common electrode 104 can also be provided in at least one of the two nose pads. Each of the electrodes described above can employ an active electrode (Reference 1).

The distortion detection unit 102 is provided in the spectacle frame 101 and detects distortion of the spectacle frame 101. The distortion detection unit 102 can be provided, for example, in a bridge of the spectacle frame 101. It is generally known that a human can voluntarily move his/her face, for example, his/her ear, by paying attention to the frontalis muscle, the auricular muscle, the temporal muscle, and the occipitalis muscle. When these muscles move, a displacement occurs between the temporal region and the glabellar. The spectacle frame 101 deflects in response to this displacement, and thus the distortion detection unit 102 detects this distortion. For example, a distortion detection unit 102 can be configured from a thin film displacement sensor (bending sensor) available from Spectra Symbol Corp.

The ear can be moved back and forth voluntarily by paying attention mainly to the frontalis muscle, the auricular muscle, the temporal muscle, and the occipitalis muscle. For example, when the wearer moves the ear back and forth, stress is generated in the spectacle frame 101 due to displacement of the ear back and forth. The stress is detected by the distortion detection unit 102, and thus the forward and backward movement of the ear of the wearer can be detected.

The eyebrows can be moved up and down as a voluntary movement by paying attention mainly to the corrugator supercilii muscle, the frontalis muscle, the procerus muscle, the orbicularis oculi muscle, the temporal muscle, and the nose muscle. For example, a stress is generated in the spectacle frame 101 due to displacement caused by the wearer moving his/her eyebrows voluntarily. The stress is detected by the distortion detection unit 102, and thus the upward and downward movement of the eyebrows of the wearer can be detected.

The first temple tip electrode 103a and the second temple tip electrode 103b are each provided in a corresponding temple tip of two temple tips of the spectacle frame 101 and each contact skin of the wearer at part of the corresponding temple tips. The first temple tip electrode 103a and the second temple tip electrode 103b configure a measurement electrode.

The first determination unit 121 determines that a movement of a face of the wearer has occurred when the distortion detection unit 102 detects distortion of the spectacle frame 101. The first determination unit 121 amplifies a potential signal obtained from the distortion detection unit 102, removes noise and the like from the amplified signal, and compares the signal after noise and the like are removed with respect to a reference signal stored to determine whether the distortion has occurred in the spectacle frame 101.

The second determination unit 122 determines whether a movement of a jaw of the wearer has occurred, based on an electric signal measured by the first temple tip electrode 103a and the second temple tip electrode 103b. The second determination unit 122 determines whether a movement of a jaw of the wearer has occurred, based on an electric signal measured by the first temple tip electrode 103a and the second temple tip electrode 103b with the common electrode 104 as a ground potential. The second determination unit 122 amplifies a potential signal obtained from the first temple tip electrode 103a and the second temple tip electrode 103b, removes noise and the like from the amplified signal, extracts, for example, a myoelectric potential signal, and compares the extracted myoelectric potential signal with respect to a reference signal stored to determine whether the movement of the jaw of the wearer has occurred.

Here, the myoelectric signals of mimetic muscles differ in amplitude from movement to movement even for an identical test muscle, and thus feature extraction for each of the test muscles is important (see Reference 2). In the feature extraction, for example, a rectified and smoothed signal is obtained from a signal waveform measured and processed, a variation in time is obtained from the waveform of the rectified and smoothed signal obtained, and the feature extraction described above is performed.

Note that digitizing processing can be performed on the measured signal in each of the determination units. Additionally, adding or subtracting processing can be performed on the obtained signal in each of the determination units. Also, each of the determination units can perform management of identification of the wearer, as necessary.

The output unit 123 outputs a command due to operation of a spectacle frame 101 by the wearer when the first determination unit 121 determines that the movement of the face of the wearer has occurred and at the same time the second determination unit 122 determines that the movement of the jaw of the wearer has occurred. The output unit 123 also has a function to feedback presence of a signal being measured or a signal output and processed by an external device to the wearer by voice, vibration, or the like.

The output unit 123 can also transmit signals processed by each of the determination units to an external device such as a smartphone or a tablet terminal, or a personal computer. For example, the output unit 123 transmits each signal to an external device by a wireless communication, such as Bluetooth (trade name) or wireless LAN, or a wired communication. The output unit 123 may also include a function of receiving a signal processed and transmitted by an external device.

The determination units and the output unit 123 may include a computer device including, such as, a central processing unit (CPU), a main storage device, an external storage device, and a network connection device. The CPU operates (executes a program) by a program deployed in the main storage device, so that each of the functions described above can be achieved.

According to the first embodiment described above, two independent and different voluntary movements of the movement of the face of the wearer and the movement of the jaw of the wearer are measured, and a command such as activating the pointing function is output when these voluntary movements are measured (detected) at the same time. In this way, in a case where one of the gestures of the user becomes an involuntary movement, the device can be prevented from reacting not to cause malfunction. The muscles of the face connect the bones to the skin and can create complex facial expressions. On the other hand, multiple muscles of a face are associated with each other by two movements. Two different types of voluntary movements can be generated functional-anatomically independently and spontaneously by the wearer on such facial muscles and skeletal structures.

Second Embodiment

Figure 2:
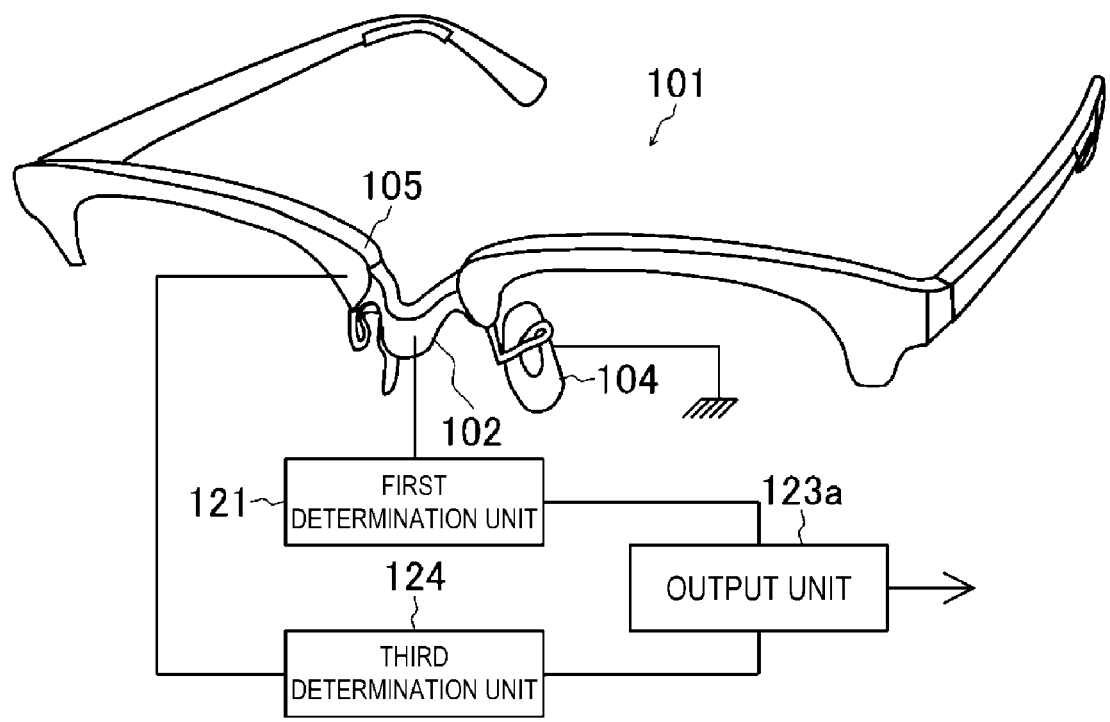
FIG. 2 is a configuration diagram illustrating a configuration of an information input device according to a second embodiment of the present invention.

Next, an information input device according to the second embodiment of the present invention will be described with reference to FIG. 2. The information input device includes a spectacle frame 101, a distortion detection unit 102, an acceleration sensor 105, a first determination unit 121, a third determination unit 124, and an output unit 123a. The information input device also includes a common electrode 104 provided in a nose pad of the spectacle frame 101 and contacts skin of a wearer of the spectacle frame 101 at a part of the nose pad. The spectacle frame 101, the distortion detection unit 102, the first determination unit 121, and the common electrode 104 are similar to those of the first embodiment described above, and the detailed description thereof is omitted.

The acceleration sensor 105 is provided in the spectacle frame 101, and measures vibration occurred in the spectacle frame 101. The acceleration sensor 105 can be provided, for example, in a rim near the bridge of the spectacle frame 101. The third determination unit 124 determines whether a movement of a jaw of the wearer has occurred, based on the vibration measured by the acceleration sensor 105. For example, the third determination unit 124 detects impact of a tooth at the time of bite by performing frequency analysis of the signal measured by the acceleration sensor 105 and extracting high-frequency components when teeth collide (Reference 3).

Note that digitizing processing can be performed on the measured signal in the third determination unit 124. Additionally, adding or subtracting processing can be performed on the obtained signal in the third determination unit 124. Also, the third determination unit 124 can perform management of identification of the wearer, as necessary.

The output unit 123a outputs a command due to operation of a spectacle frame 101 by the wearer when the first determination unit 121 determines that the movement of the face of the wearer has occurred and at the same time the third determination unit 124 determines that the movement of the jaw of the wearer has occurred. The output unit 123a also has a function to feedback presence of a signal being measured or a signal output and processed by an external device to the wearer by voice, vibration, or the like.

According to the third embodiment described above, two independent and different voluntary movements of the movement of the face of the wearer and the movement of the jaw of the wearer are measured, and a command such as activating the pointing function is output when these voluntary movements are measured (detected) at the same time. In this way, in a case where one of the gestures of the user becomes an involuntary movement, the device can be prevented from reacting not to cause malfunction.

As described above, in accordance with aspects of embodiments of the present invention, the first determination unit determines whether the movement of the face of the wearer has occurred and the second determination unit determines whether the movement of the jaw of the wearer of the spectacle frame has occurred, and thus it is possible to input information in a natural form for the user with the burden of the user being reduced.

Meanwhile, the present invention is not limited to the embodiments described above, and it will be obvious to those skilled in the art that various modifications and combinations can be implemented within the technical idea of the present invention.

Reference 1: BIOPAC SYSTEMS, Inc., "Active Electrode: TSD150 Series", [Searched on May 22, 2020], (http://biopac-sys.jp/products/tsd150a/).

Reference 2: Kaoru Ichikawa and Junichi Hori, "Development of Interface System using Electromyograms of Face Movements" loth Forum on Information Technology, Vol. 2, G-018, pp. 559-560, 2011.

Reference 3: Rika Yamashita, et al., "Propagation of the High Frequency Component Caused by the Impact on the Tooth", Journal of Prosthodontic Research, Vol. 43, pp. 489-494, 1999.

REFERENCE SIGNS LIST

101 Spectacle frame
102 Distortion detection unit
103a First temple tip electrode
103b Second temple tip electrode
104 Common electrode
105 Acceleration sensor
121 First determination unit
122 Second determination unit
123 Output unit
123a Output unit
124 Third determination unit.

The invention claimed is:

1. An information input device comprising:
a spectacle frame including a bridge;
a distortion detection circuit provided in the bridge of the spectacle frame and configured to directly detect distortion of the spectacle frame;
a measurement electrode in the spectacle frame and configured to measure an electric signal caused by a movement of a jaw of a wearer of the spectacle frame;
a first determination circuit configured to determine that a first voluntary movement of a movement of a face of the wearer has occurred when the distortion detection circuit detects the distortion of the spectacle frame;
a second determination circuit configured to determine whether a second voluntary movement of the movement of the jaw of the wearer has occurred, based on the electric signal measured by the measurement electrode; and
an output circuit configured to output a command due to operation of the spectacle frame by the wearer only when the first determination circuit determines that the first voluntary movement independent of the second voluntary movement has occurred concurrently with the second determination circuit determining that the second voluntary movement has occurred.

2. The information input device according to claim 1, wherein:
the spectacle frame includes a temple tip; and
the measurement electrode is disposed in the temple tip.

3. The information input device according to claim 2, wherein:
the temple tip includes a first temple tip and a second temple tip; and
the measurement electrode includes a first temple tip electrode and a second temple tip electrode disposed in the first temple tip and the second temple tip, respectively, the first temple tip electrode and the second temple tip electrode each being configured to come into contact with skin of the wearer.

4. The information input device according to claim 3, wherein:
the spectacle frame further includes a nose pad; and the information input device further includes a common electrode disposed in the nose pad and configured to come into contact with the skin of the wearer.

5. An information input device comprising:
a spectacle frame including a bridge;
a distortion detection circuit provided in the bridge of the spectacle frame and configured to directly detect distortion of the spectacle frame;
an acceleration sensor in the spectacle frame and configured to measure vibration occurring on the spectacle frame;
a first determination circuit configured to determine that a first voluntary movement of a movement of a face of a wearer has occurred when the distortion detection circuit detects the distortion of the spectacle frame;
a second determination circuit configured to determine whether a second voluntary movement of a movement of a jaw of the wearer has occurred, based on the vibration measured by the acceleration sensor; and
an output circuit configured to output a command due to operation of the spectacle frame by the wearer only when the first determination circuit determines that the first voluntary movement independent of the second voluntary movement has occurred concurrently with the second determination circuit determining that the second voluntary movement has occurred.

6. The information input device according to claim 5, wherein:
the acceleration sensor is disposed in the bridge.

7. A method of operation an information input device, the method comprising:
directly detecting, by a distortion detection circuit in a bridge of a spectacle frame, distortion of the spectacle frame;
measuring, by a measurement electrode in the spectacle frame, an electric signal caused by a movement of a jaw of a wearer of the spectacle frame;
determining that a first voluntary movement of a movement of a face of the wearer has occurred when the distortion detection circuit detects the distortion of the spectacle frame;
determining whether a second voluntary movement of the movement of the jaw of the wearer has occurred, based on the electric signal measured by the measurement electrode; and
outputting, by an output circuit, a command due to operation of the spectacle frame by the wearer only when determining that the first voluntary movement independent of the second voluntary movement has occurred concurrently with determining that the second voluntary movement has occurred.

8. The method according to claim 7, wherein:
the spectacle frame includes a temple tip; and
the measurement electrode is disposed in the temple tip.

9. The method according to claim 8, wherein:
the temple tip includes a first temple tip and a second temple tip; and
the measurement electrode includes a first temple tip electrode and a second temple tip electrode disposed in the first temple tip and the second temple tip, respectively, the first temple tip electrode and the second temple tip electrode each being configured to come into contact with skin of the wearer.

10. The method according to claim 9, wherein:
the spectacle frame further includes a nose pad; and
a common electrode is disposed in the nose pad and configured to come into contact with the skin of the wearer.

* * * * *